United States Patent
Dinc et al.

(10) Patent No.: US 6,293,554 B1
(45) Date of Patent: Sep. 25, 2001

(54) BRUSH SEAL SEGMENT HAVING BRISTLE DAMPING

(75) Inventors: Osman Saim Dinc, Troy, NY (US); Yahya Dogu, Yahsihan-Kirikkale (TR); Michael Eugene Battle, Forest Park, OH (US); Robert Joseph Albers, Park Hills, KY (US); Robert Proctor, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/451,246

(22) Filed: Nov. 29, 1999

Related U.S. Application Data
(60) Provisional application No. 60/134,184, filed on May 13, 1999.

(51) Int. Cl.[7] .................................................. F16J 15/447
(52) U.S. Cl. ............................................................ 277/355
(58) Field of Search ............................................. 277/355

(56) References Cited

U.S. PATENT DOCUMENTS

| | | | |
|---|---|---|---|
| 5,066,024 | * 11/1991 | Reisinger et al. | 277/355 |
| 5,318,309 | * 6/1994 | Tseng et al. | 277/355 |
| 5,400,952 | 3/1995 | Hetico et al. | 228/185 |
| 5,496,045 | * 3/1996 | Millener et al. | 277/355 |
| 5,961,280 | 10/1999 | Turnquist et al. | 415/173.3 |
| 5,971,400 | 10/1999 | Turnquist et al. | 277/416 |

* cited by examiner

Primary Examiner—Chuck Y. Mah
Assistant Examiner—Enoch E Peavey
(74) Attorney, Agent, or Firm—Patrick K. Patnode; Douglas E. Stoner

(57) ABSTRACT

A brush seal segment useful, when circumferentially arrayed with other such segments, to seal the gap between a rotor and a surrounding casing of a rotary machine such as a gas or steam turbine. Brush-seal bristles are positioned between a brush-seal back plate and a brush-seal front plate with the free end of each bristle extending beyond the edges of the plates. The front plate has a portion extending to the edge of the front plate with the portion spaced apart from the bristles. In one example, the portion has an array of through holes. In another example, the portion has a ledge projecting generally away from the bristles.

20 Claims, 2 Drawing Sheets

BRUSH SEAL SEGMENT HAVING BRISTLE DAMPING

This application claims priority of a Provisional Application entitled "Upstream Flow Protection Devices For A Brush Seal" by Osman S. Dinc et al., Ser. No. 60/134,184 filed May 13, 1999.

BACKGROUND OF THE INVENTION

The present invention relates generally to seals, and more particularly to a brush seal segment.

Rotary machines include, without limitation, turbines for steam turbines and compressors and turbines for gas turbines. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

Annular brush seals have been proposed for use between a rotor and a surrounding casing in gas and steam turbines. The annular brush seal is made up of circumferentially-arrayed brush seal segments. Each brush seal segment is attached to the casing and includes a back (i.e., downstream) plate, a front (i.e., upstream) plate, and bristles which are positioned between the back and front plates with the free end of generally each bristle extending beyond the edges of the back and front plates. The bristles typically are canted at an angle of generally forty-five degrees in the direction of rotation of the rotor, and the free ends of the bristles are close to (and may even touch) the rotor. Typically, the front plate (and in some designs also portions of the back plate), near the free ends of the bristles, is spaced apart from the bristles to allow room for the bristles to flex and recover during transient encounters of the free ends of the bristles with the rotor. When the upstream gas flow is turbulent, some of the flow can swirl between the front plate and the bristles causing bristle flutter (i.e., instability) which quickly wears the bristles leading to premature brush seal failure. What is needed is a design for a brush seal segment which reduces bristle flutter in a turbulent-flow environment.

BRIEF SUMMARY OF THE INVENTION

In a first expression of an embodiment of the invention, a brush seal segment includes a back plate, a front plate, and bristles. The bristles are positioned between the back and front plates with the free end of generally each bristle extending beyond the edges of the back and front plates. The front plate has a portion extending to the edge of the front plate, such portion spaced apart from the bristles and having an array of through holes.

In a second expression of an embodiment of the invention, a brush seal segment includes a brush-seal holder having a shape of generally an annular segment of a circular ring. The holder has an annular back plate and an annular front plate each generally coaxially aligned with the longitudinal axis of the ring and each having an inner circumferential edge generally facing the axis. The brush seal segment also includes bristles positioned longitudinally between the back and front plates with the free end of generally each bristle extending beyond the edges of the back and front plates. The edge of the back plate extends closer to the axis than does the edge of the front plate. The front plate has a portion extending to the edge of the front plate, such portion longitudinally spaced apart from the bristles and having an array of through holes.

In a third expression of an embodiment of the invention, a brush seal segment includes a back plate, a front plate, and bristles. The bristles are positioned between the back and front plates with the free end of generally each bristle extending beyond the edges of the back and front plates. The front plate has a portion extending to the edge of the front plate, such portion spaced apart from the bristles and such portion at the edge of the front plate having a ledge projecting generally away from the bristles.

In a fourth expression of an embodiment of the invention, a brush seal segment includes a brush-seal holder having a shape of generally an annular segment of a circular ring. The holder has an annular back plate and an annular front plate each generally coaxially aligned with the longitudinal axis of the ring and each having an inner circumferential edge generally facing the axis. The brush seal segment also includes bristles positioned longitudinally between the back and front plates with the free end of generally each bristle extending beyond the edges of the back and front plates. The edge of the back plate extends closer to the axis than does the edge of the front plate. The front plate has a portion extending to the edge of the front plate, such portion longitudinally spaced apart from the bristles and such portion at the edge of the front plate having a ledge projecting generally longitudinally away from the bristles.

Several benefits and advantages are derived from the invention. In the first and second expressions of an embodiment of the invention, as shown by engineering analysis, the through holes in the front plate allow a subflow to pass therethrough and purge the space between the front plate and the bristles of turbulent flow otherwise entering the space near the free ends of the bristles such that the free ends of the bristles are damped since they experience a more stable flow resulting in less bristle flutter and hence increased brush-seal wear. In the third and fourth expressions of an embodiment of the invention, as shown by engineering analysis, the upstream-extending ledge of the front plate acts to channelize the turbulent flow such that the free ends of the bristles are damped since they experience a more stable flow resulting in less bristle flutter and hence increased brush-seal wear.

DETAILED DESCRIPTION OF THE INVENTION

Figure 1:
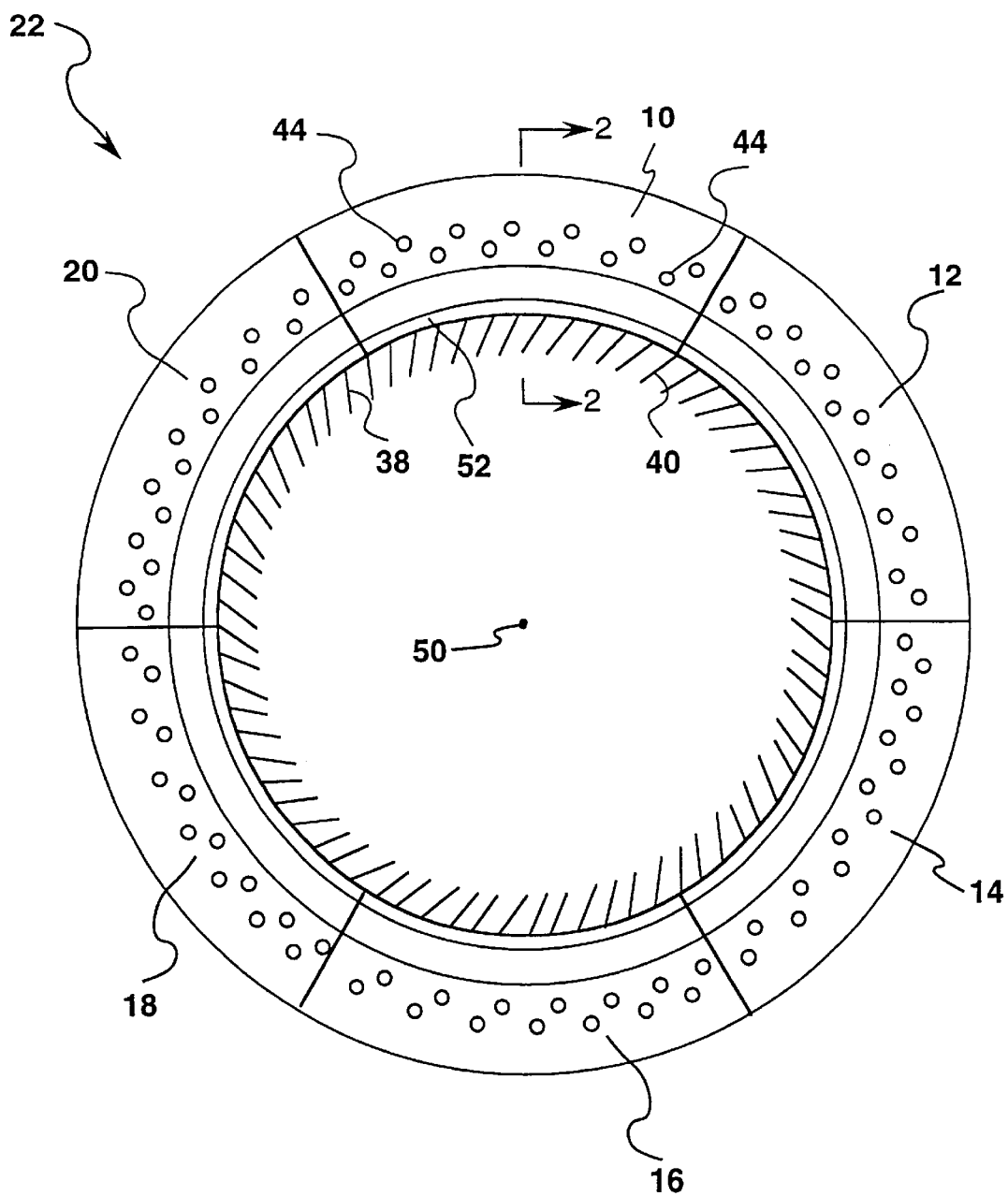
FIG. 1 is a schematic front (i.e., downstream-facing) view of an embodiment of the brush seal segment of the invention shown circumferentially arrayed with other identical brush seal segments to define an annular brush seal.
Figure 2:
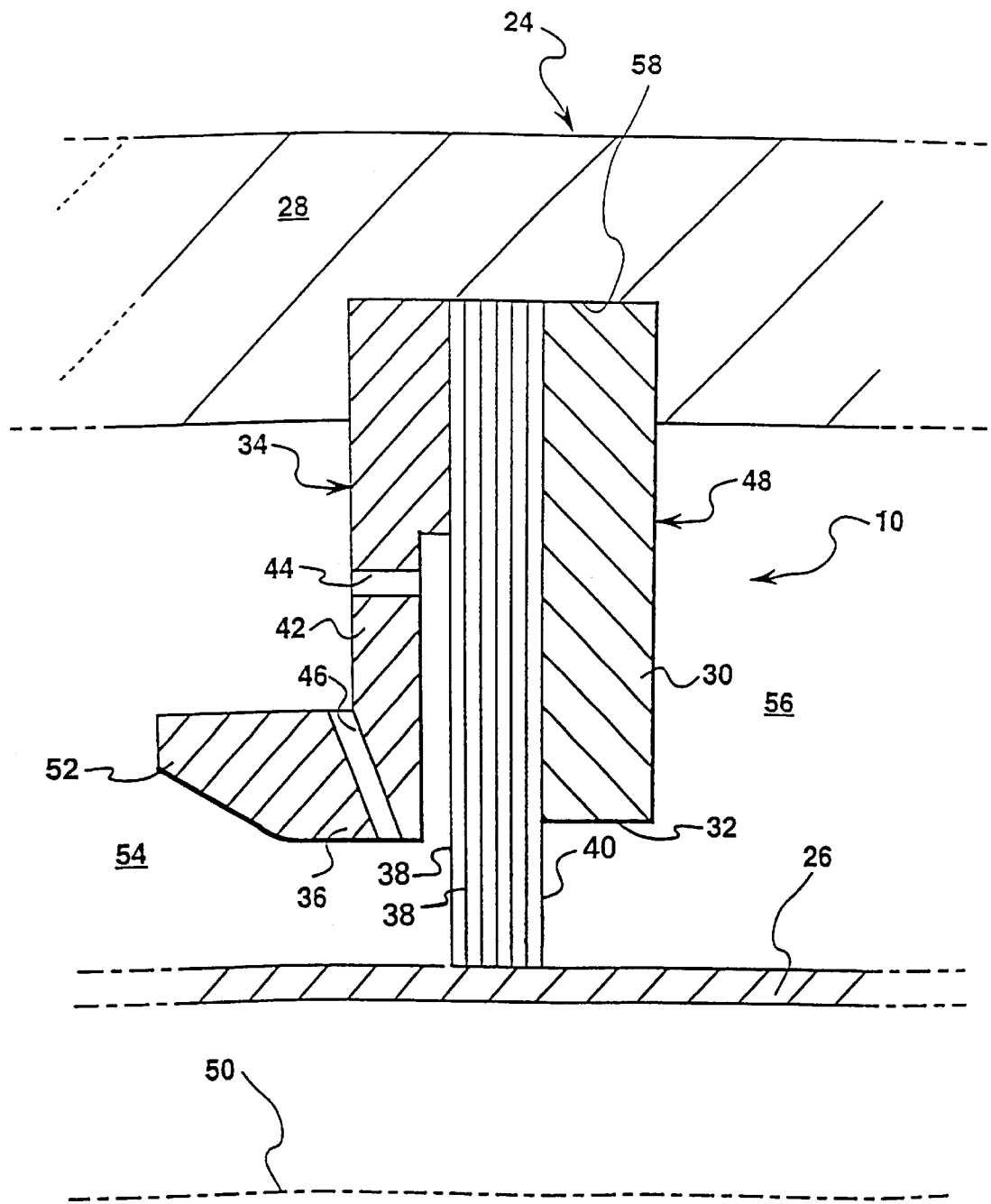
FIG. 2 is a cross-sectional view of one of the brush seal segments of the brush seal of FIG. 1, taken along lines 2—2 of FIG. 1, showing the brush seal segment installed in a gas turbine assembly.

Referring now to the drawings, FIG. 1 schematically shows an embodiment of the brush seal segment 10 of the present invention together with five other identical brush seal segments 12, 14, 16, 18, and 20 all circumferentially arrayed to define an annular brush seal 22. FIG. 2 shows one of the brush seal segments 10 installed in an embodiment of a gas turbine assembly 24 (only a portion of which is shown in FIG. 2), such gas turbine assembly 24 having a rotor 26 and a casing 28 radially spaced apart from and circumferentially surrounding the rotor 26, such brush seal segment 10 disposed in the annular gap between the rotor 26 and the casing 28, and such brush seal segment 10 attached to the casing 28. It is noted that the brush seal segment 10 could be disposed in any other rotary machine including, without limitation, a steam turbine.

In a first expression of the embodiment of the invention shown in the figures, a brush seal segment 10 includes a brush-seal back plate 30 having an edge 32, a brush-seal front plate 34 having an edge 36, and a plurality of brush-seal bristles 38 each having a free end 40. The bristles 38 are disposed between the back and front plates 30 and 34 with the free end 40 of generally each bristle 38 extending beyond the edges 32 and 36 of the back and front plates 30 and 34. The front plate 34 has a portion 42 extending to the edge 36 of the front plate 34 with the portion 42 spaced apart from the bristles 38. The portion 42 of the front plate 34 has an array of through holes 44 and 46.

In one design, the brush seal segment 10 has only one front plate 34, and, in another design, the front plate 34 is a manually-rigid front plate 34. By "manually-rigid" is meant that the front plate 34 cannot be flexed by hand by an adult person of average strength. A single, rigid front plate is less prone to unwanted flutter in a turbulent gas flow and is less susceptible to damage during shipping and installation and during maintenance of nearby turbine components. In one example, the through holes 44 and 46 include first holes 44 each having a length which is greater than the distance from the portion 42 of the front plate 34 to the bristles 38. A longer first hole 44 will channelize a gas subflow, and a shorter exit distance to the bristles 38 will improve the control of the directed impact of the channelized gas subflow from the first holes 44 against the bristles 38. It is noted from the figures that the bristles 38 closest to the portion 42 of the front plate 34 generally lie in a plane. In another example, the first holes 44 are aligned generally perpendicular to the plane. In one application, the first holes 44 are all of the through holes 44 and 46 which are visible in a drawing of a front (i.e., downstream-facing) view of the brush seal segment 10 (such as in FIG. 1).

In a second expression of the embodiment of the invention shown in the figures, a brush seal segment 10 includes a brush-seal holder 48 having a shape of generally an annular segment of a circular ring, wherein the ring has a longitudinal axis 50. The brush-seal holder 48 has an annular brush-seal back plate 30 and an annular brush-seal front plate 34 each generally coaxially aligned with the axis 50 and each having an inner circumferential edge 32 and 36 generally facing the axis 50. The brush seal segment 10 also includes a plurality of brush-seal bristles 38 each having a free end 40. The bristles 38 are disposed longitudinally between the back and front plates 30 and 34 with the free end 40 of generally each bristle 38 extending beyond the edges 32 and 36 of the back and front plates 30 and 34. The edge 32 of the back plate 30 extends closer to the axis 50 than does the edge 36 of the front plate 34. The front plate 34 has a portion 42 extending to the edge 36 of the front plate 34 with the portion 42 longitudinally spaced apart from the bristles 38. The portion 42 of the front plate 34 has an array of through holes 44 and 46.

In one design, the brush seal segment 10 has only one front plate 34, and, in another design, the front plate 34 is a manually-rigid front plate 34. A single, rigid front plate is less prone to unwanted flutter in a turbulent gas flow and is less susceptible to damage during shipping and installation and during maintenance of nearby turbine components. In one example, the through holes 44 and 46 include first holes 44 each having a length which is greater than the distance from the portion 42 of the front plate 34 to the bristles 38. A longer first hole 44 will channelize a gas subflow, and a shorter exit distance to the bristles 38 will improve the control of the directed impact of the channelized gas subflow from the first holes 44 against the bristles 38. In another example, the first holes 44 are aligned generally parallel to the axis 50.

In one application, the first holes 44 are all of the through holes 44 and 46 which are visible in a drawing of a front (i.e., downstream-facing) view of the brush seal segment 10 (such as in FIG. 1).

In a third expression of the embodiment of the invention shown in the figures, a brush seal segment 10 includes a brush-seal back plate 30 having an edge 32, a brush-seal front plate 34 having an edge 36, and a plurality of brush-seal bristles 38 each having a free end 40. The bristles 38 are disposed between the back and front plates 30 and 34 with the free end 40 of generally each bristle 38 extending beyond the edges 32 and 36 of the back and front plates 30 and 34. The front plate 34 has a portion 42 extending to the edge 36 of the front plate 34 with the portion 42 spaced apart from the bristles 38. The portion 42 of the front plate 34 at the edge 36 of the front plate 34 has a ledge 52 projecting generally away from the bristles 38.

In one design, the brush seal segment 10 has only one front plate 34, and, in another design, the front plate 34 is a manually-rigid front plate 34. A single, rigid front plate is less prone to unwanted flutter in a turbulent gas flow and is less susceptible to damage during shipping and installation and during maintenance of nearby turbine components. In another design, as noted from the figures, the bristles 38 closest to the portion 42 of the front plate 34 generally lie in a plane, the portion 42 of the front plate 34 has a thickness along a direction perpendicular to the plane, and the thickness of the ledge 52 of the portion 42 of the front plate 34 is greater than twice the thickness of any other part of the portion 42 of the front plate 34. A longer ledge 52 will channelize a turbulent gas flow reducing unwanted bristle flutter. In one example, the portion 42 of the front plate 34 has an array of through holes 44 and 46, with the portion 42 apart from the ledge 52 containing an array of first holes 44 (as otherwise previously described in the first and second expressions of the embodiment of the invention shown in the figures), and with the ledge 52 of the portion 42 containing an array of second holes 46. The second holes 46 each are generally aligned such that a gas subflow exiting the second holes 46 is directed to impact the free ends 40 of the bristles 38 in the absence of any other flow. In another example, the second holes 46 are the only through holes 44 and 46 which are visible in a drawing (not shown) of a radially-inward view, and in a drawing (not shown) of a radially-outward view, of the brush seal segment 10. The aligned second holes 46 help keep unwanted turbulent flow from entering the space between the front plate 34 and the bristles 38 reducing unwanted bristle flutter.

In a fourth expression of the embodiment of the invention shown in the figures, a brush seal segment 10 includes a brush-seal holder 48 having a shape of generally an annular segment of a circular ring, wherein the ring has a longitudinal axis 50. The brush-seal holder 48 has an annular brush-seal back plate 30 and an annular brush-seal front plate 34 each generally coaxially aligned with the axis 50 and each having an inner circumferential edge 32 and 36 generally facing the axis 50. The brush seal segment 10 also includes a plurality of brush-seal bristles 38 each having a free end 40. The bristles 38 are disposed longitudinally between the back and front plates 30 and 34 with the free end 40 of generally each bristle 38 extending beyond the edges 32 and 36 of the back and front plates 30 and 34. The edge 32 of the back plate 30 extends closer to the axis 50 than does the edge 36 of the front plate 34. The front plate 34 has a portion 42 extending to the edge 36 of the front plate 34 with the portion 42 longitudinally spaced apart from the bristles 38. The portion 42 of the front plate 34 at the edge 36 of the front plate 34 has a ledge 52 projecting generally longitudinally away from the bristles 38.

In one design, the brush seal segment 10 has only one front plate 34, and, in another design, the front plate 34 is a manually-rigid front plate 34. A single, rigid front plate is less prone to unwanted flutter in a turbulent gas flow and is less susceptible to damage during shipping and installation and during maintenance of nearby turbine components. In another design, as noted from the figures, the bristles 38 closest to the portion 42 of the front plate 34 generally lie in a plane, the portion 42 of the front plate 34 has a thickness along a direction perpendicular to the plane (i.e., parallel to the axis 50), and the thickness of the ledge 52 of the portion 42 of the front plate 34 is greater than twice the thickness of any other part of the portion 42 of the front plate 34. A longer ledge 52 will channelize a turbulent gas flow reducing unwanted bristle flutter. In one example, the portion 42 of the front plate 34 has an array of through holes 44 and 46, with the portion 42 apart from the ledge 52 containing an array of first holes 44 (as otherwise previously described in the first and second expressions of the embodiment of the invention shown in the figures), and with the ledge 52 of the portion 42 containing an array of second holes 46. The second holes 46 each are generally aligned such that a gas subflow exiting the second holes 46 is directed to impact the free ends 40 of the bristles 38 in the absence of any other flow. In another example, the second holes 46 are the only through holes 44 and 46 which are visible in a drawing (not shown) of a radially-inward view, and in a drawing (not shown) of a radially-outward view, of the brush seal segment 10. The aligned second holes 46 help keep unwanted turbulent flow from entering the space between the front plate 34 and the bristles 38 reducing unwanted bristle flutter.

In any expression of the embodiment of the invention shown in the figures, the bristles 38 are each canted at a generally-identical angle with respect to a corresponding radius line (not shown) extending outward (from the axis 50) to each of the bristles 38. In one example, the angle of the bristles 38 is generally forty-five degrees. In a typical construction, the back plate 30 and the front plate 34 each are of monolithic construction and consist essentially of metal or metal alloy such as, but not limited to, stainless steel. The bristles 38 typically consist essentially of metal-wire or ceramic-wire bristles such as, but not limited to, cobalt-based-alloy wire bristles. In one construction, metal-wire bristles 38 are attached to the brush-seal holder 48 by welding (such weldment omitted from the figures for clarity). As seen in FIG. 2, the brush seal segment 10 has a high-pressure side 54 and a low-pressure side 56, with the radially-outward part of the brush-seal holder 48 attached to the casing 28 (such as by engagement of the brush seal segment 10 with a slot 58 in the casing 28), and with the inwardly-projecting free ends 40 (as seen in the view of FIG. 2) of the bristles 38 disposed proximate (and in one application disposed as to just touch) the rotor 26. The back plate 30 is a downstream plate, and the front plate 34 is an upstream plate. Gas flow is from the high-pressure side 54 of the brush seal segment 10 to the low-pressure side 56 of the brush seal segment 10. It is noted again that the brush seal segment 10 is an annular segment of a circular ring having a longitudinal axis 50. It is herein pointed out that, for the purpose of illustration, the circular ring may be considered to be the annular brush seal 22 shown in FIG. 1. Although the embodiment of the brush seal segment 10 shown in the figures has the portion 42 with through holes 44 and 46 and with a ledge 52, the invention is not so limited and includes, without limitation, designs wherein the portion 42 has through holes 44 but does not have the ledge 52 and designs wherein the portion 42 has a ledge 52 but does not have through holes 44 and/or 46, etc.

The foregoing description of several expressions of an embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A brush seal segment comprising:
   a) a brush-seal back plate having an edge;
   b) a brush seal front plate having an edge; and
   c) a plurality of brush-seal bristles each having a free end;
   wherein said bristles are disposed between said back and front plates with said free end of generally each bristle extending beyond said edges of said back and front plates,
   wherein said front plate has a portion extending to said edge of said front plate with said portion spaced apart from said bristles,
   wherein said portion of said front plate has an array of through holes, and
   wherein at least one of said array of through holes is aligned to direct a gas flow to impact said free end of said plurality of brush seal bristles.

2. The brush seal segment of claim 1, wherein said brush seal segment has only one front plate.

3. The brush seal segment of claim 2, wherein said front plate is a manually-rigid front plate.

4. The brush seal segment of claim 3, wherein said through holes include first holes each having a length which is greater than the distance from said portion of said front plate to said bristles.

5. The brush seal segment of claim 4, wherein said bristles closest to said portion of said front plate generally lie in a plane, and wherein said first holes are aligned generally perpendicular to said plane.

6. A brush seal segment comprising:
   a) a brush-seal holder having a shape of generally an annular segment of a circular ring, wherein said ring has a longitudinal axis, and wherein said holder has an annular brush-seal back plate and an annular brush-seal front plate each generally coaxially aligned with said axis and each having an inner circumferential edge generally facing said axis; and
   b) a plurality of brush-seal bristles each having a free end,
   wherein said bristles are disposed longitudinally between said back and front plates with said free end of generally each bristle extending beyond said edges of said back and front plates, wherein said edge of said back plate extends closer to said axis than does said edge of said front plate, wherein said front plate has a portion extending to said edge of said front plate with said portion longitudinally spaced apart from said bristles, wherein said portion of said front plate has an array of through holes, and wherein at least one of said array of through holes is aligned to direct a gas flow to impact said free end of said plurality of brush seal bristles.

7. The brush seal segment of claim 6, wherein said brush seal segment has only one front plate.

8. The brush seal segment of claim 7, wherein said front plate is a manually-rigid front plate.

9. The brush seal segment of claim 8, wherein said through holes include first holes each having a length which is greater than the distance from said portion of said front plate to said bristles.

10. The brush seal segment of claim 9, wherein said first holes are aligned generally parallel to said axis.

11. A brush seal segment comprising:
a) a brush-seal back plate having an edge;
b) a brush-seal front plate having an edge; and
c) a plurality of brush-seal bristles each having a free end;
wherein said bristles are disposed between said back and front plates with said free end of generally each bristle extending beyond said edges of said back and front plates,
wherein said front plate has a portion extending to said edge of said front plate with said portion spaced apart from said bristles, and
wherein said portion of said front plate at said edge of said front plate has a ledge disposed to face an incoming gas flow, projecting generally away from said bristles.

12. The brush seal segment of claim 11, wherein said brush seal segment has only one front plate.

13. The brush seal segment of claim 12, wherein said front plate is a manually-rigid front plate.

14. The brush seal segment of claim 13, wherein said bristles closest to said portion of said front plate generally lie in a plane, wherein said portion has a thickness along a direction perpendicular to said plane, and wherein said thickness of said ledge of said portion of said front plate is greater than twice said thickness of any other part of said portion of said front plate.

15. The brush seal segment of claim 14, wherein said ledge has an array of second holes.

16. A brush seal segment comprising:
a) a brush-seal holder having a shape of generally an annular segment of a circular ring, wherein said ring has a longitudinal axis, and wherein said holder has an annular brush-seal back plate and an annular brush-seal front plate each generally coaxially aligned with said axis and each having an inner circumferential edge generally facing said axis; and
b) a plurality of brush-seal bristles each having a free end,
wherein said bristles are disposed longitudinally between said back and front plates with said free end of generally each bristle extending beyond said edges of said back and front plates,
wherein said edge of said back plate extends closer to said axis than does said end of said front plate,
wherein said front plate has a portion extending to said edge of said front plate with said portion longitudinally spaced apart from said bristles, and
wherein said portion of said front plate at said edge of said front plate has a ledge disposed to face an incoming gas flow, projecting generally longitudinally away from said bristles.

17. The brush seal segment of claim 16, wherein said brush seal segment has only one front plate.

18. The brush seal segment of claim 17, wherein said front plate is a manually-rigid front plate.

19. The brush seal segment of claim 18, wherein said bristles closest to said portion of said front plate generally lie in a plane, wherein said portion has a thickness along a direction perpendicular to said plane, and wherein said thickness of said ledge of said portion of said front plate is greater than twice said thickness of any other part of said portion of said front plate.

20. The brush seal segment of claim 19, wherein said ledge has an array of through holes.

\* \* \* \* \*